United States Patent
Widrig et al.

(10) Patent No.: US 11,940,073 B2
(45) Date of Patent: Mar. 26, 2024

(54) HOSE CLAMP

(71) Applicant: Oetiker Schweiz AG, Horgen (CH)

(72) Inventors: Markus Widrig, Benken SG (CH); Andreas Vetter, Pfäffikon (CH); Maxime Bösiger, Einsiedeln (CH)

(*) Notice: Subject to any disclaimer, the term of this patent is extended or adjusted under 35 U.S.C. 154(b) by 301 days.

(21) Appl. No.: 17/429,675

(22) PCT Filed: Nov. 27, 2019

(86) PCT No.: PCT/EP2019/082694
§ 371 (c)(1),
(2) Date: Aug. 10, 2021

(87) PCT Pub. No.: WO2020/169222
PCT Pub. Date: Aug. 27, 2020

(65) Prior Publication Data
US 2022/0154861 A1    May 19, 2022

(30) Foreign Application Priority Data
Feb. 22, 2019  (EP) ..................................... 19158842

(51) Int. Cl.
*F16L 33/035*    (2006.01)
(52) U.S. Cl.
CPC .................... *F16L 33/035* (2013.01)
(58) Field of Classification Search
CPC ...... F16L 33/023; F16L 33/025; F16L 33/035; Y10T 24/1482; Y10T 24/1478; Y10T 24/1412
See application file for complete search history.

(56) References Cited

U.S. PATENT DOCUMENTS 5,581,851 A * 12/1996 Nagano ................. F16L 33/035
                                                      24/23 EE
5,669,113 A *  9/1997 Fay ........................ B65D 63/04
                                                      24/20 R
(Continued)

FOREIGN PATENT DOCUMENTS

EP      1867881 A1    12/2007
WO   2009152832 A1    12/2009

OTHER PUBLICATIONS

International Search Report Form PCT/ISA/210, and Written Opinion Form PCT/ISA/210, International Application No. PCT/EP2019/082694, pp. 1-10 International Filing Date Nov. 27, 2019.

*Primary Examiner* — Aaron M Dunwoody
(74) *Attorney, Agent, or Firm* — David L. Nocilly; Bond Schoeneck & King, PLLC (57) ABSTRACT

The hose clamp described herein consists of a clamping band (10) with overlapping band sections in the closed state of the hose clamp, on which hooks (12, 19) are arranged for closing the hose clamp, and with a tightening device (15) arranged in the outer band section for tightening the hose clamp around an object to be clamped. The hooks (12, 19) are stamped out from the clamping band under cold working and each have a lug (21, 25). In the closed state of the hose clamp, the lug (21) of a hook (12) arranged on the inner band section and the lug (25) of a hook (19) arranged on the outer band section engage over each other, and the force is transmitted via transverse surfaces (27, 32) of the hooks (12, 19) that are in contact with each other.

10 Claims, 8 Drawing Sheets

(56) References Cited

U.S. PATENT DOCUMENTS

| | | | |
|---|---|---|---|
| 7,013,534 B2 * | 3/2006 | Nagano | F16L 33/035 24/23 EE |
| 2003/0014846 A1 * | 1/2003 | Kim | F16L 33/025 24/20 R |
| 2017/0227030 A1 | 8/2017 | Kobayakawa | |

* cited by examiner

Fig. 14

HOSE CLAMP

CROSS-REFERENCE TO RELATED APPLICATIONS

The present application is a US national phase of PCT Application No. PCT/EP2019/082694, filed on Nov. 27, 2019, the disclosure of which is incorporated herein by reference in its entirety.

STATE OF THE ART

Hose clamps for connecting a hose to a pipe nipple, for example, are usually designed with a given nominal diameter in such a way that, when tightened, the inner surface of the clamping band is in contact with the hose over its entire circumference without any gaps and a continuous surface pressure is achieved between the hose and the pipe nipple.

A hose clamp is known from WO 2017/005283 A1, in which the outer end section of the clamping band has a plurality of openings and an ear-like tightening device for tightening the hose clamp around the material to be tied and the inner end section has hooks which can be hooked into the openings for closing the hose clamp. The outer end portion of the clamping band further has a band arch for receiving and guiding a tongue provided at the inner end of the clamping band.

SUMMARY OF THE INVENTION

The invention is based on the general object of at least partially eliminating disadvantages that occur in comparable hose clamps of the prior art. A more specific object of the invention can be seen in the provision of a hose clamp adjustable in diameter with high strength of the parts connecting the inner and outer band sections.

The solution to this problem is achieved with the hose clamp described herein. In this hose clamp, hooks for closing the hose clamp are arranged on the overlapping band sections, which hooks are stamped out of the clamping band, are strongly cold-formed when pressed to less than the thickness of the metal sheet and each have a lug, wherein, in the closed state of the hose clamp, the lug of at least one hook arranged on the inner band section and the lug of a hook arranged on the outer band section engage over one another and wherein the force transmission takes place, in the tightened state of the hose clamp, via transverse surfaces of the hooks which are in contact with one another.

The process of cold forming and thus hardening provides the hooks with a high degree of strength (in particular, local hardening portions can be formed which strengthen the hooks); their height may thus be low so that they protrude less far from the clamping band. This improves the line of force application between the hooks. The main amount of force transmission happens via the transverse surfaces of the hook located on the inner band section and the hook located on the outer band section. At the same time, the risk of injury from the hose clamp and damage to the hose clamp itself is reduced. An opening cap contributes to the hooks being formed compactly in height, as it provides the necessary space for the positioning hook to be hooked onto the pulling hook.

Due to the interlocking design of the pulling hook and the opening cap, the pitch of the positioning hooks can be reduced, which allows the diameter to be changed in small steps.

The configuration of the hooks according to the invention further facilitates the hooking-in of the clamping band sections in the bent state of the hose clamp.

The areas of the clamping band at the pulling hooks and/or at the positioning hooks can be reinforced by means of lateral reinforcing embossments between the edges of the clamping band and the pulling or positioning hooks. These reinforcing embossments can be configured as beads projecting radially outwards from the clamping band and each extending over the entire extension of the pulling or positioning hooks or only a part thereof. Such reinforcement beads are particularly useful in the areas of the clamping band that end up in a position underneath the tightening device in the closed state of the hose clamp after locking the hose clamp. This applies in particular to the area of the positioning hooks and the adjacent area of the clamping band adjacent on the tongue side. An additional configuration of these reinforcement beads as corrugated beads results in a particular stabilisation of the clamping band against buckling in radial direction underneath the tightening device.

DRAWINGS

Two embodiments of the invention are explained in more detail below with reference to the drawings. Herein.

EMBODIMENT

Figure 1:
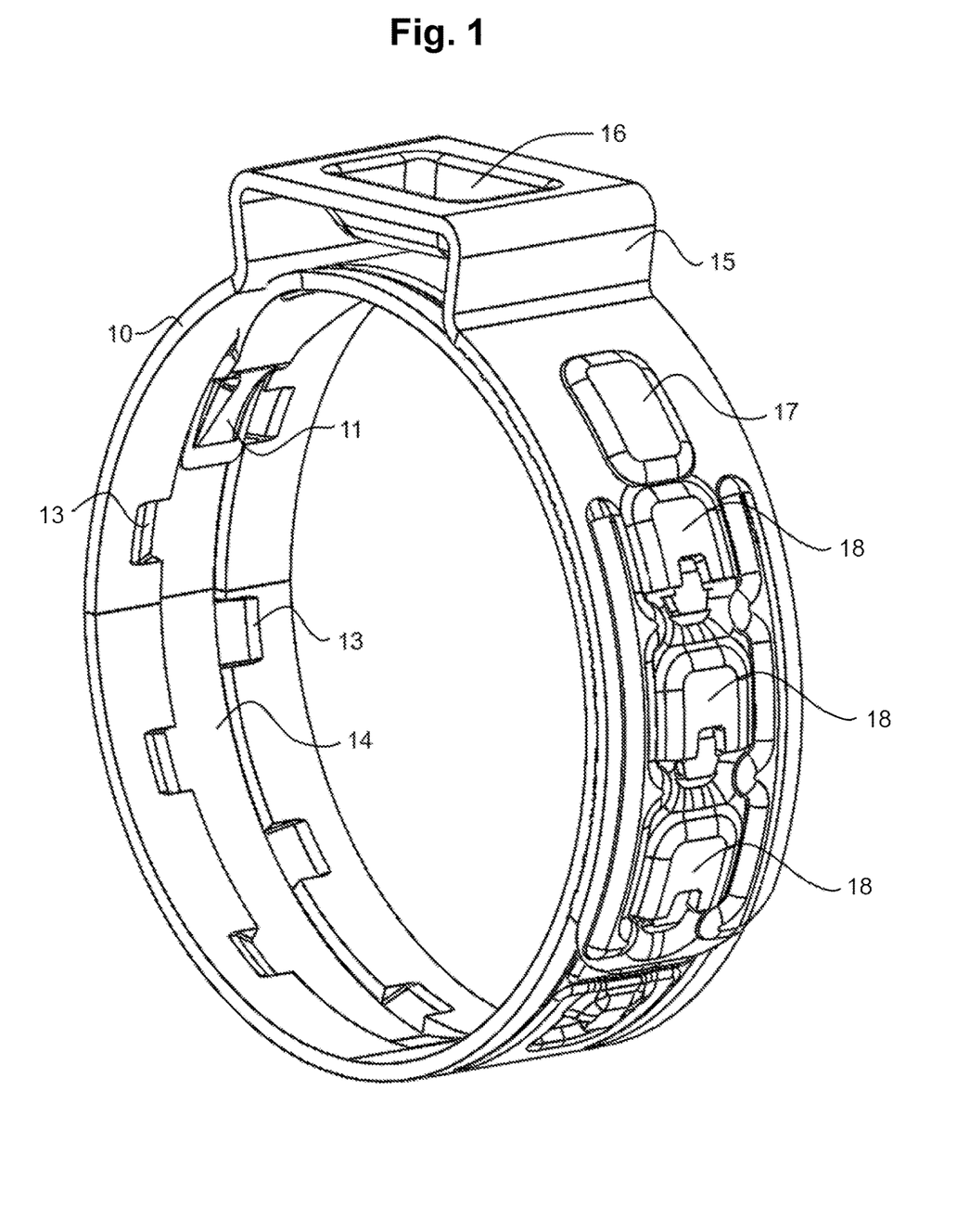
FIG. 1 shows the hose clamp in the closed state according to an embodiment of the invention.
Figure 2:
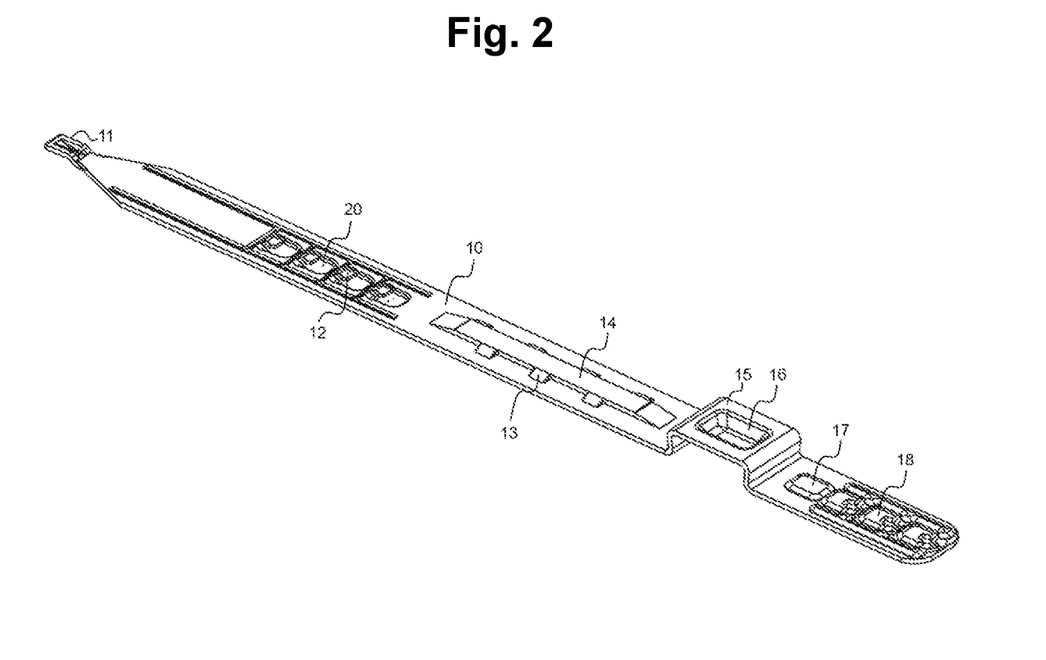
FIGS. 2 and 3 show the hose clamp in the stretched initial state, seen from the outer and inner sides, respectively, in the closed state.
Figure 3:
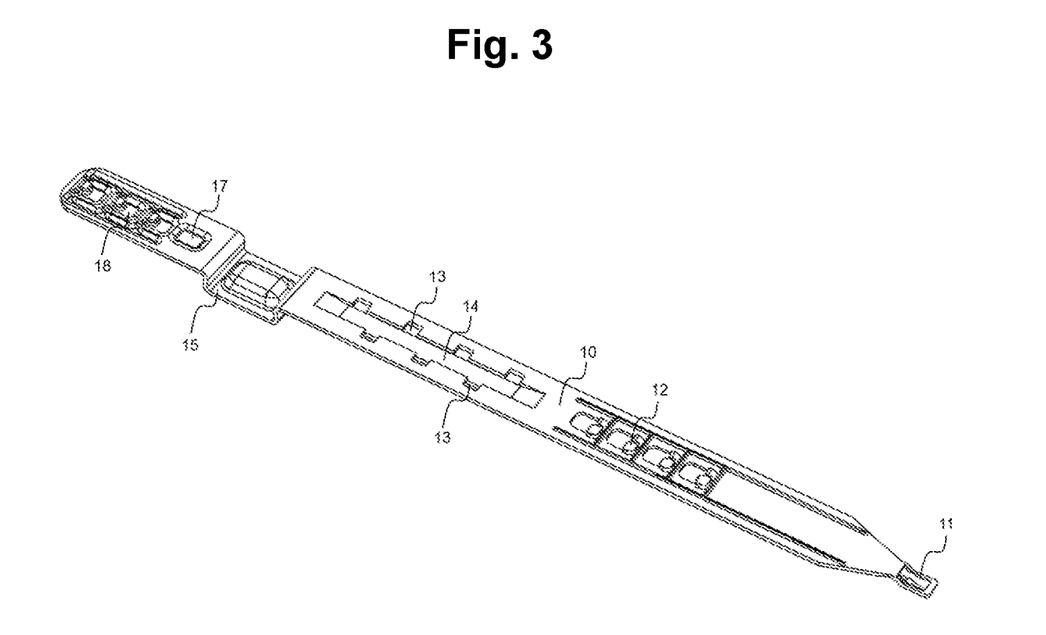
Figure 4:
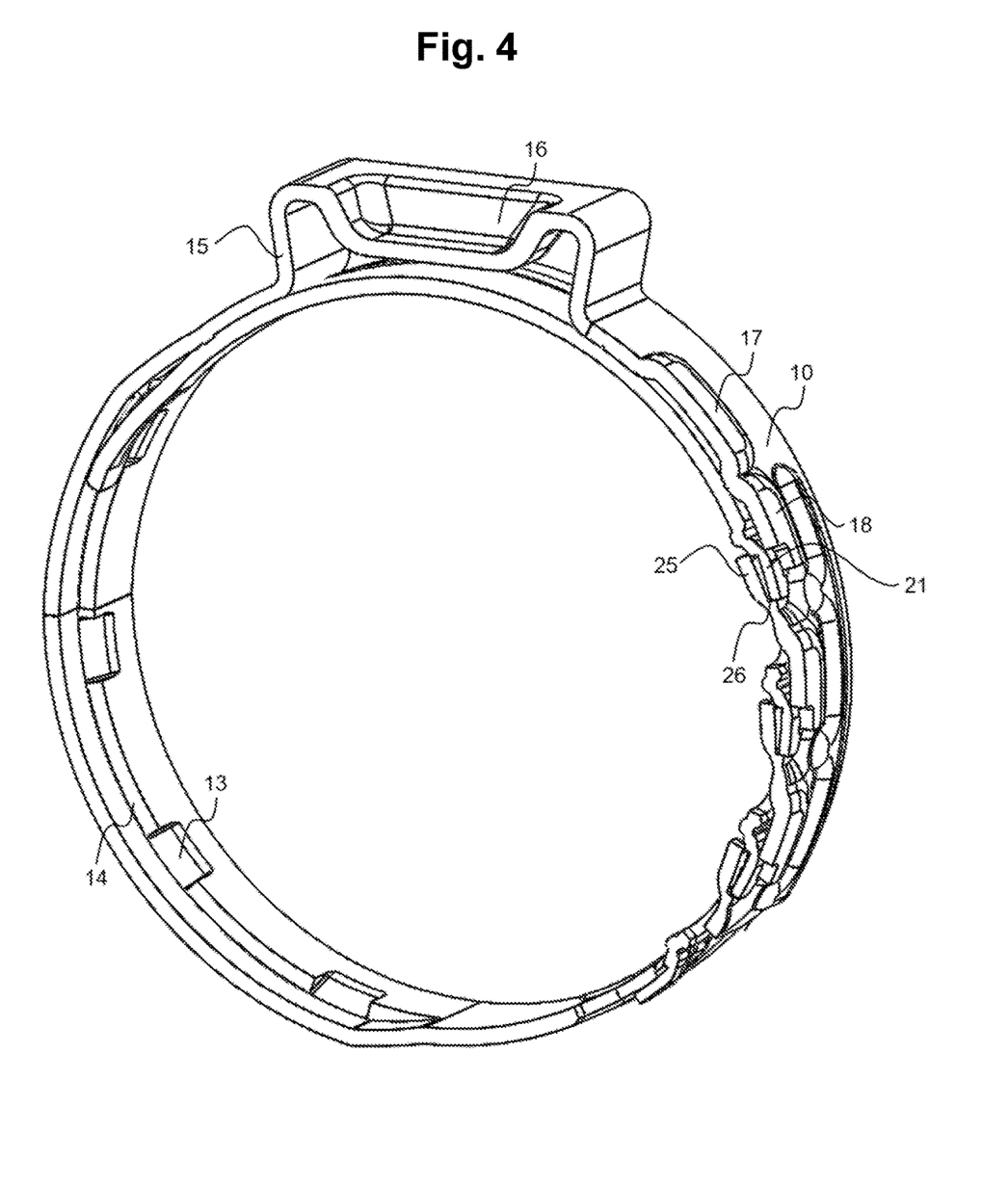
FIG. 4 shows the hose clamp of FIG. 1, cut along the center line of the clamping band.
Figure 5:
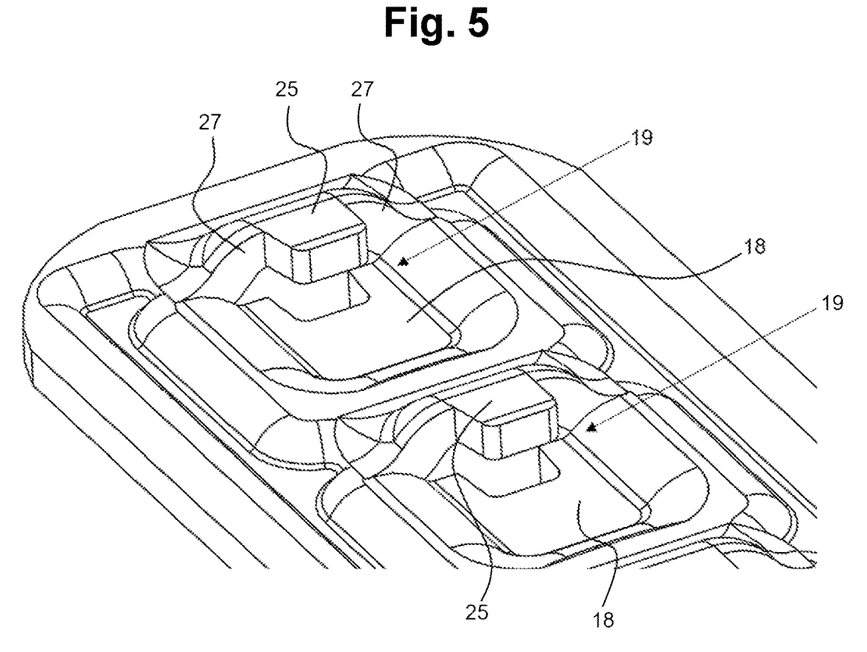
FIGS. 5 and 6 show enlarged illustrations of the hooks formed in the clamping band.
Figure 6:
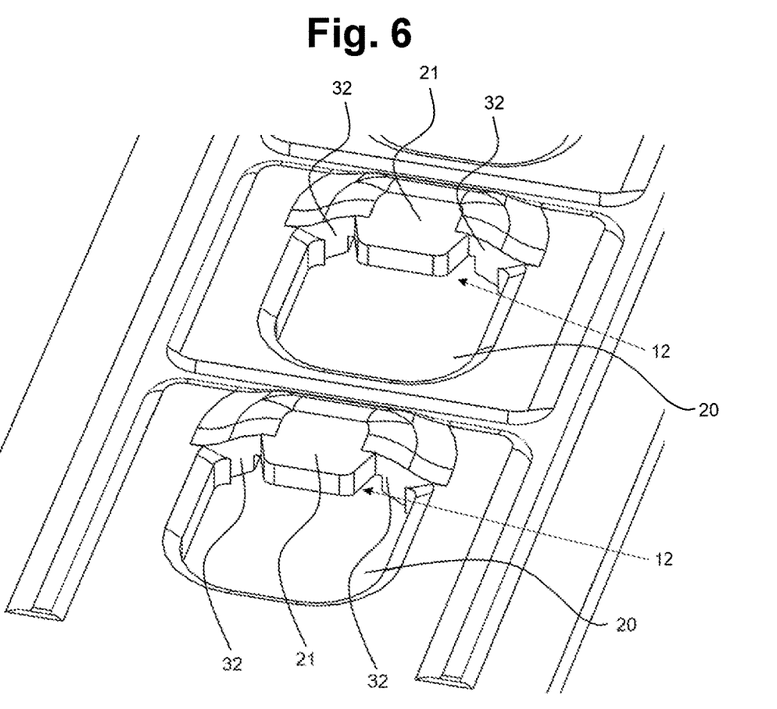
Figure 7:
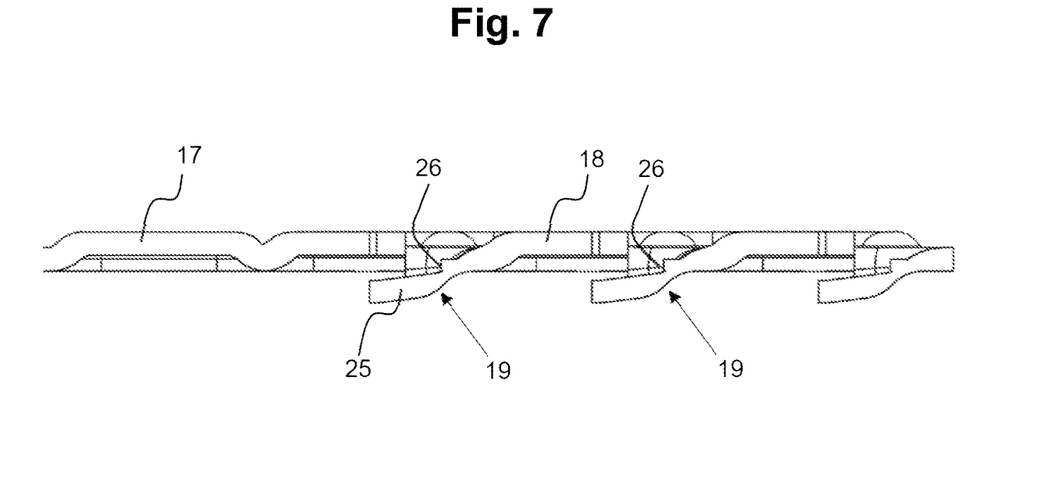
FIGS. 7 and 8 show cross-sections through the outer and inner sections of the clamping band in the stretched state.
Figure 8:
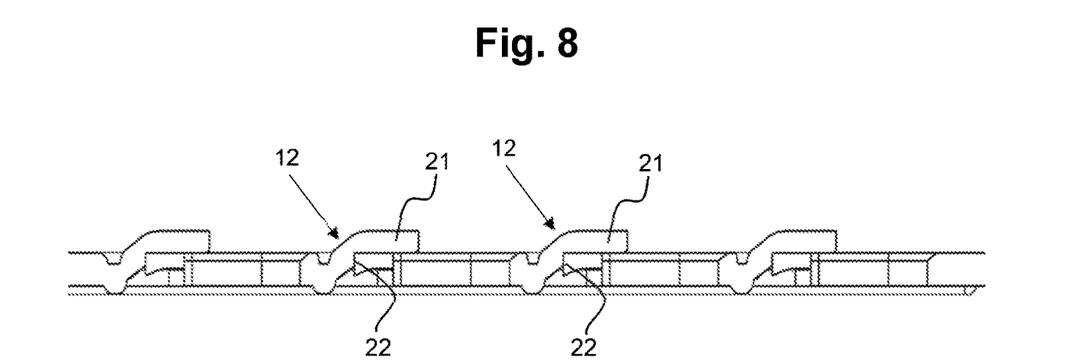

The hose clamp shown in FIGS. 1 to 3 consists of an open clamping band 10 which, starting from the inner band end shown in FIG. 2 at the top left (in FIG. 3 at the bottom right), has a tongue 11, a series of positioning hooks 12 (four in the example shown), a band arch 14 cut out of the clamping band 10 by two parallel longitudinal cuts and connected via flaps 13 to side parts of the clamping band 10, a tightening device 15 in the form of a so-called "Oetiker" ear with a pair of outwardly cranked legs and a bar connecting them and reinforced by a bead 16, a release hood 17 and, in the other outer band section, three pulling hooks 19 and opening caps 18.

The hose clamp described herein is intended in particular for sealing and fastening bellows, for example for use in cardan shafts, made of thermoplastic materials or other materials of high Shore hardness that are hard to deform.

In use, the hose clamp which is supplied by the manufacturer in the closed state, is pulled axially onto the item to be tied, such as a pipe nipple and a hose surrounding it or, alternatively, opened for radial assembly and placed around the material to be tied, with the tongue 11 ending up positioned under the band arch 14.

The three pulling hooks 19 in the outer belt section are then engaged with the positioning hooks 12 arranged in the inner band section, which correspond to the smallest possible diameter of the respective material to be tied.

In the example shown, there are three pulling hooks 19. Depending on the force and strength requirements, two pulling hooks or a single pulling hook may be sufficient or more than three pulling hooks 19 may be required.

The number of positioning hooks 12 is greater than that of the pulling hooks 19 in order to allow for a corresponding range of variation in the clamp diameter. In the embodiment shown, only four positioning hooks 12 are assumed for the sake of simplicity. In FIG. 1 the hose clamp is closed at the largest diameter. For the smallest closed diameter, the positioning hook 12 closest to the inner end of the belt would in this case be underneath the release cap 17, and the next three positioning hooks 12 would be in engagement with the three pulling hooks 19.

As can be seen in particular from FIGS. 2, 3, 6 and 8, each positioning hook 12 is arranged in a clearance window 20 cut out from the clamping band 10. It comprises a lug 21 which is connected to the clamping band 10 at its edge facing away from the tightening device 15 and extends essentially parallel to the clamping band 10. At the transition to the lug 21, a step 22 is formed radially inwards and facing away from the tightening device 15.

As shown in particular in FIGS. 1, 2, 5 and 7, each pulling hook 19 is curved dome-like radially inwards and has a lug 25 which engages over the lug 21 of the positioning hook 12. The opening cap 18, which is formed radially outwards on the opposite side of the pulling hook, provides the necessary space for the positioning hook 12, so that the lug 25 of the pulling hook 19 can engage over the lug 21 of the positioning hook 12. At the transition to the lug 25, a step 26 is formed radially outwards and facing the tightening device 15.

The lugs 21, 25 of the positioning and pulling hooks 12, 19 hold the outer and inner clamping band sections on top of each other, while the force is transmitted between transverse surfaces 27 of the pulling hooks 19, which are transverse to the longitudinal direction of the clamping band 10, and transverse surfaces 32 of the positioning hooks 12, which are transverse to the longitudinal direction of the clamping band 10, when the hose clamp is tightened.

Depending on the configuration length of the lugs 25 and 21, the step 22 of the positioning hook 12 can abut with the free end of the lug 25 of the pulling hook 19 and the step 26 of the pulling hook 19 can abut with the free end of the lug 21 of the positioning hook 12 in the closed position of the hose clamp, which generates a secondary force transmission location and results in a mutual stabilisation of the hooks arranged on the inner and outer band sections.

Figure 9:
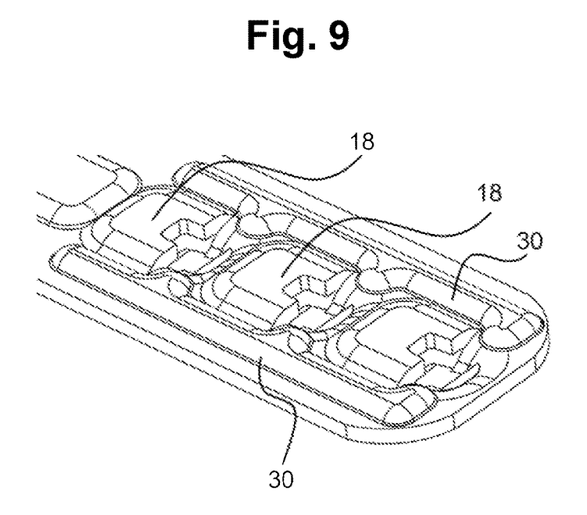
FIG. 9 shows the end of the outer clamping band section.

As shown in FIG. 9, the pulling hooks 19 and opening caps 18 are surrounded by reinforcement beads 30 embossed in the clamping band 10, which increase the bending stiffness for a given material thickness and allow the transmission of higher forces.

Figure 10:
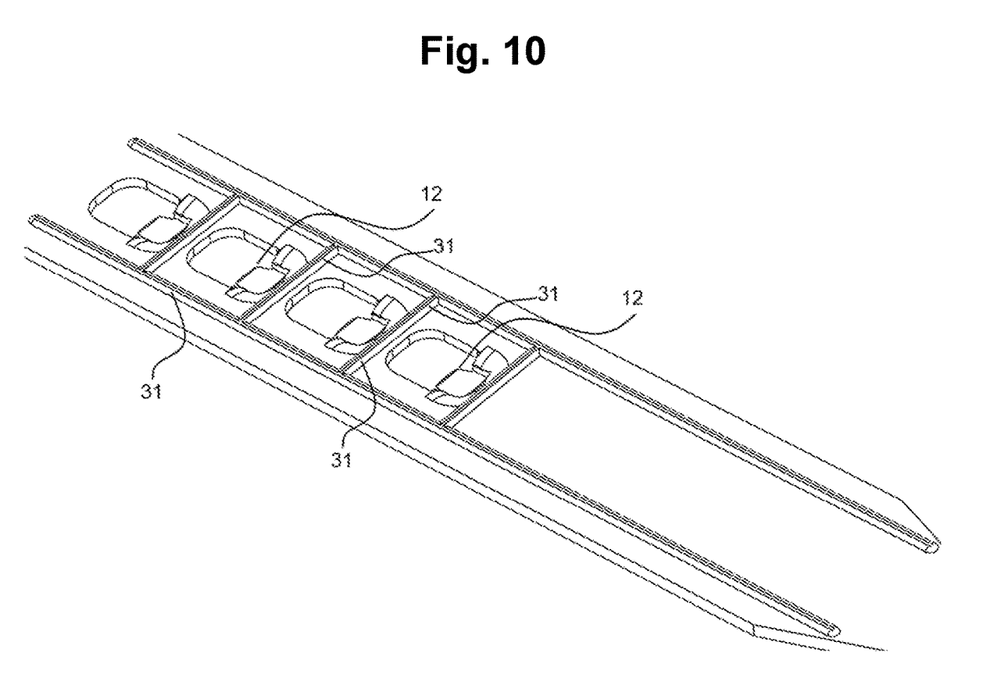
FIG. 10 shows a part of the inner clamping band section, seen from the inner side of the hose clamp in the closed state.
Figure 11:
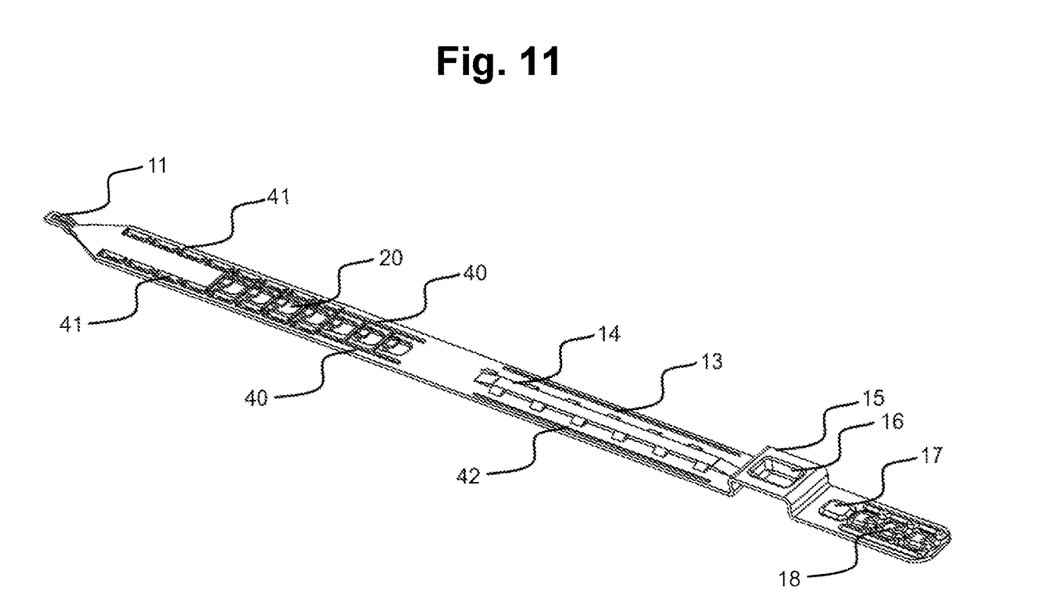
FIGS. 11 and 12 show the hose clamp in the stretched initial state according to a further embodiment of the invention, seen from the outer and inner sides, respectively, in the closed state.
Figure 12:
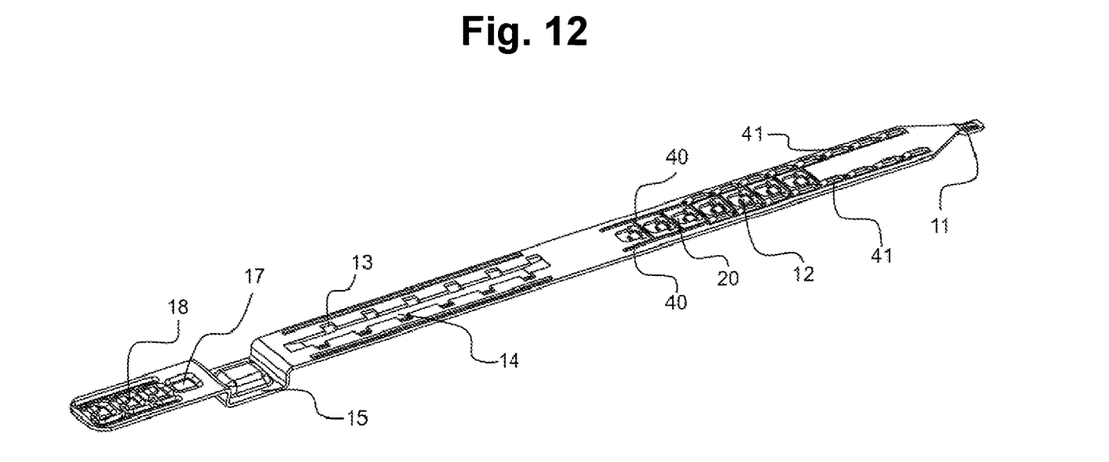
Figure 13:
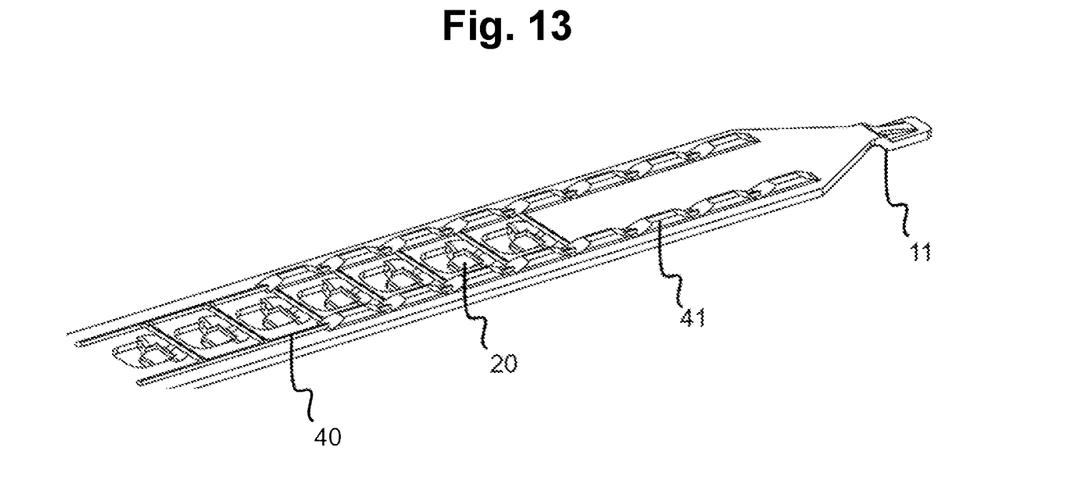
FIG. 13 shows an enlarged view of the tongue end of the clamping band according to the further embodiment and FIG. 14 shows an enlarged view of the band arch section of the clamping band according to the further embodiment.
Figure 14:
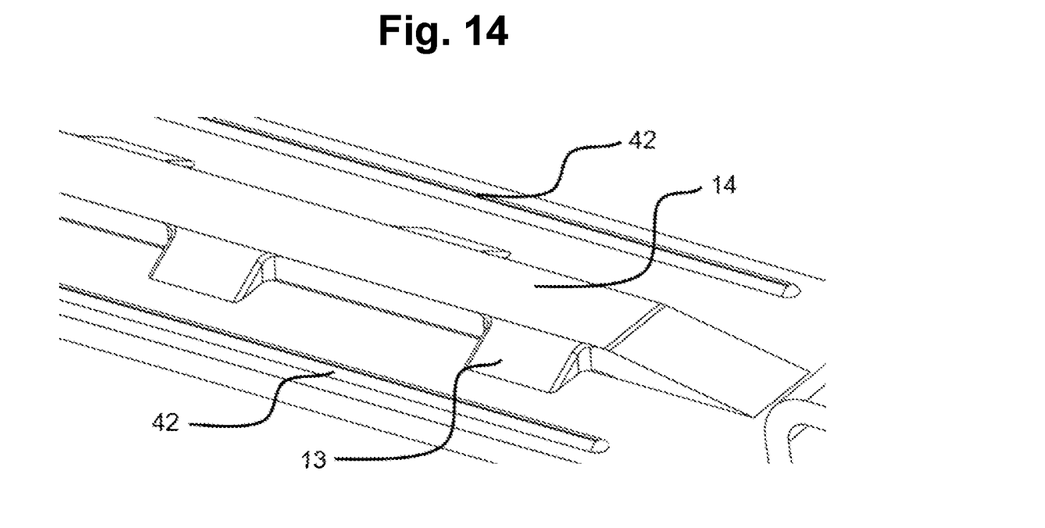

For the same reason, according to FIG. 10, the clearance windows 20 of the positioning hooks 12 are stiffened by embossments 31 between the windows 20 and the side edges of the clamping band 10.

FIGS. 11 to 14 show a further embodiment of the invention, in which a section of the clamping band 10 is formed with lateral reinforcement beads, partly in continuous groove shape 40 and as corrugated beads 41 in interrupted groove shape.

In the closed state of the hose clamp, one or more of the positioning hooks 12 are in engagement with the corresponding number of tension pulling 19, depending on the hose diameter. On the tongue side thereof, a part of the inner end of the band reaches the position underneath the tightening device 15. The lateral corrugation beads 41 provided in the appropriate part of the clamping band 10 stabilise the clamping band 10 against buckling in the radial direction underneath the tightening device 15. The corrugation beads 41 can be configured in the form of interrupted grooves or as a series of individual beads. On both sides of the clamping band 10, they merge into continuous groove-shaped reinforcement beads 40.

Lateral reinforcement beads 42 are provided in the area of the band arch 14 forming a tongue channel for the tongue 11 and accommodating it in the closed state. Since breakage occurs frequently in the area of the band arch 14, the additional reinforcement beads 42 effectively contribute to a stabilisation of the band arch area.

In the present embodiment, the reinforcement beads 40, 41, 42 are provided both in the area of the positioning hooks 12 and in the area of the pulling hooks 19 in order to jointly contribute to the overall stability of the hose clamp. However, it is also conceivable to provide only the reinforcement or corrugation beads 40, 41 or only the reinforcement beads 42.

REFERENCE SIGNS 10 clamping band
11 tongue
12 positioning hook
13 flaps
14 band arch
15 tightening device
16 bead
17 release cap
18 opening hood
19 pulling hook
20 clearance window
21 lug
22 step
25 lug
26 step
27 transverse surface
30 reinforcement beads
31 embossment
32 transverse surface
40 reinforcement bead
41 corrugated bead
42 reinforcement bead

The invention claimed is:

1. A hose clamp made of a clamping band (10) comprising band sections which overlap one another in a closed state of the hose clamp and on which hooks (12, 19) are arranged for closing the hose clamp, and a tightening device (15) arranged in an outer band section for tightening the hose clamp around an object to be clamped, characterised in that the hooks (12, 19) are stamped out from the clamping band and each have a lug (21, 25) and a transverse surface (27, 32) facing transversely to a direction of the clamping band (10), wherein, in the closed state of the hose clamp, the lug (21) of at least one hook (12) arranged on the inner band section and the lug (25) of a hook (19) arranged on the outer band section engage over one another and a force transmission in a tightened state of the hose clamp occurs via the mutually contacting transverse surfaces (27, 32) of the hooks (12, 19).

2. The hose clamp according to claim 1, wherein, in the closed state of the hose clamp, a step (22) of a hook (12) arranged on the inner band section abuts with an end face of the lug (25) of a hook (19) arranged on the outer band section and a step (26) of a hook (19) arranged on the outer band section abuts with the end face of the lug (21) of a hook (12) arranged on the inner band section.

3. The hose clamp according to claim 1, wherein at least one hook configured as a pulling hook (19) is arranged on the outer band section and one or more hooks designed as positioning hooks (12) are arranged on the inner band section.

4. The hose clamp according to claim 3, wherein three pulling hooks (19) and at least three positioning hooks (12) are provided.

5. The hose clamp according to claim 3, wherein the pulling hooks (19) and/or the positioning hooks (12) are each surrounded by reinforcement beads (30) stamped out from the clamping band (10).

6. The hose clamp according to claim 3, wherein the clamping band (10) has reinforcing embossments (31, 40, 41, 42) arranged between the tightening hooks (19) and a pair of clamping band edges and/or between the positioning hooks (12) and the clamping band edges.

7. The hose clamp according to claim 6, wherein reinforcement beads (40, 41) arranged between the positioning hooks (12) and the clamping band edges are continued towards the end of the inner band section.

8. The hose clamp according to claim 6, wherein the reinforcement beads arranged between the positioning hooks (12) and the clamping band edges are formed as corrugated beads (41) over their entire length or over a part of their length.

9. The hose clamp according to claim 8, wherein the reinforcement beads arranged between the positioning hooks (12) and the clamping band edges are formed as corrugated beads (41) over a part of the inner band section which is positioned underneath the tensioning device (15) in the closed state of the hose clamp.

10. The hose clamp according to claim 1, wherein the positioning hooks (12) and pulling hooks (19) are reinforced by local hardening portions occurring due to the manufacturing process.

* * * * *